June 13, 1950         R. T. JACOBS ET AL         2,510,980
RECOVERY OF GLUTAMIC MATERIAL IN
THE IONIC PURIFICATION TREATMENT
OF SUGAR-BEARING SOLUTIONS Filed Feb. 12, 1949                                         7 Sheets—Sheet 1

STARTING SOLUTION
Raw Beet Sugar Juice (Diffuser Juice)

A. Defecation Treatment:
Removes Suspended Impurities from the Juice

B. Cooling:
Conditions the Defecated Juice for Subsequent De-Ionization

C. Primary Ion-Exchange Treatment:
(De-Ionization Treatment) Subjects the Defecated and Cooled Juice Sequentially to:

(a) Primary Cation-Exchange Treatment so Conducted that Inorganic Anions are Rendered into Acid Form while Cationic Organics are Displaced into the Juice    } STEP I (b) Primary Anion Exchange Treatment whereby Acids are Adsorbed while Cationic Organics Remain in the Juice, Producing "De-Ionized Juice".    } STEP II D. Evaporation:
Effects Concentration of "De-Ionized Juice" along with Conversion of Cationic Glutamic Compound to Anionic P. C. by Heat, to produce "Impure Conversion Syrup" Carrying P. C. along with some Residual Contaminating Cations and with Non-Glutamic Cationic Organics. This is followed by Cooling.    } STEP III E. Secondary Ion Exchange Treatment:
Subjects the Cooled "Impure Conversion Syrup" sequentially to:

(a) Secondary Cation Exchange Treatment: To Effect Separation from the "Impure Conversion Syrup" of Contaminating Residual Cations and Cationic Organics, Allowing Anionic P.C. to Remain in the Syrup. There Results "Purified Conversion Syrup" Containing P. C. Substantially Pure.    } STEP IV (b) Secondary Anion Exchange Treatment: To Effect Separation of Anionic P. C. from the "Purified Conversion Syrup" by retention of P. C. on the Exchange Material, Allowing "Pure Green Syrup" to Flow Therefrom.    } STEP V F. Unloading P. C. from the Secondary Anion Exchange Bed by Regeneration with $NH_4OH$, Producing as an Effluent Solution "P. C.-Liquor" Pure.    } STEP VI G. Reconverting P. C. and Recovering Glutamic Compound: By Treating "P. C.-Liquor" to Effect Reconversion of P. C. to Glutamic Compound Substantially Pure, and Precipitating and Separating "Glutamic Compound" From the Mother Liquor.    } STEP VII, VIII, IX $T_1$, $T_2$, $T_3$

Fig. I.

INVENTOR
Elliott B. Fitch
Ray T. Jacobs
BY
ATTORNEY

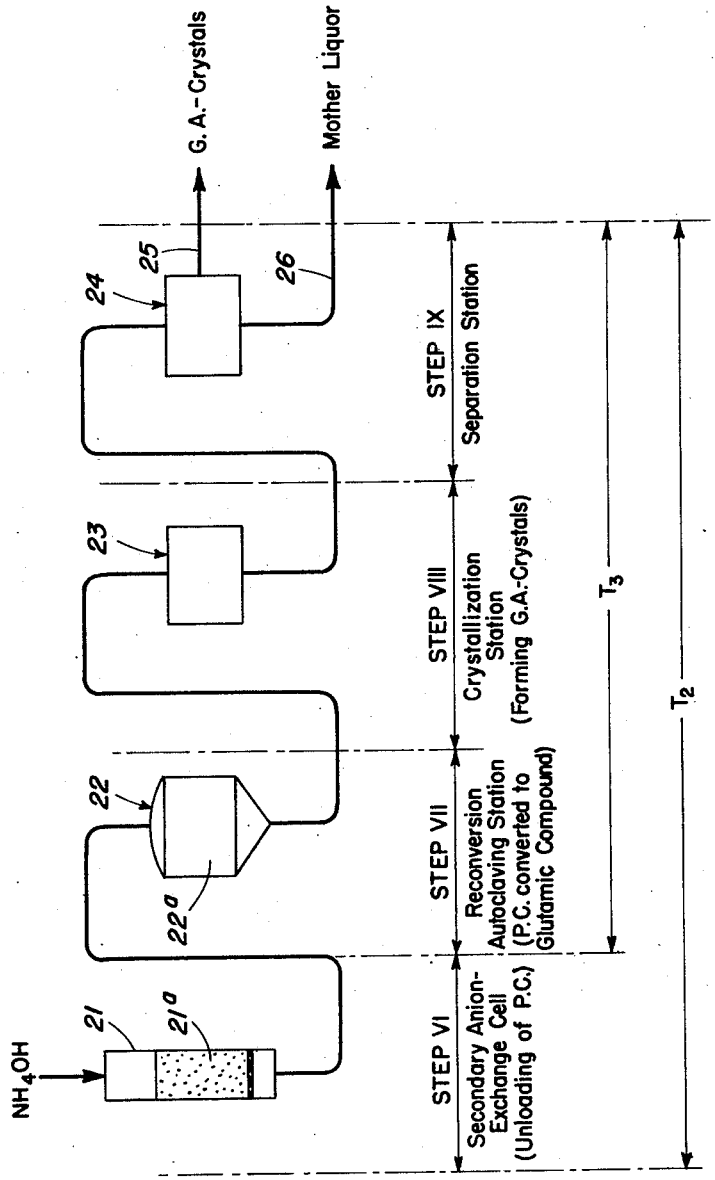
Fig. 2ª.

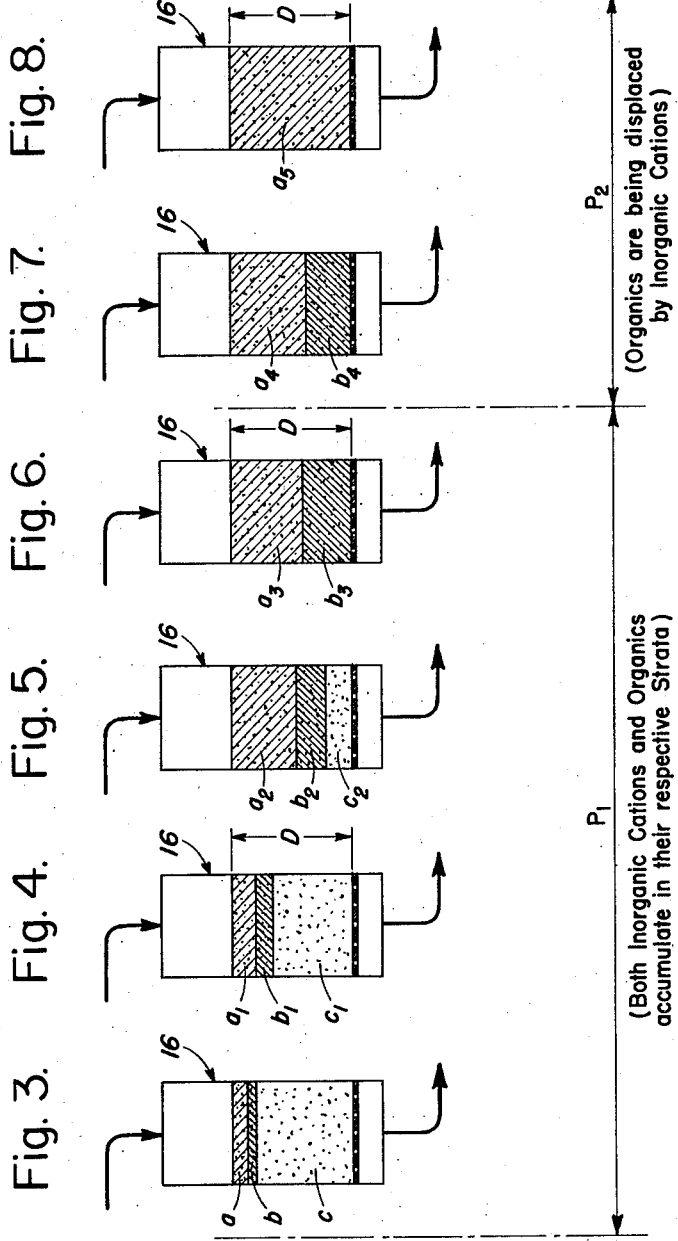

June 13, 1950

R. T. JACOBS ET AL 2,510,980

RECOVERY OF GLUTAMIC MATERIAL IN
THE IONIC PURIFICATION TREATMENT
OF SUGAR-BEARING SOLUTIONS

Filed Feb. 12, 1949

INVENTOR
Elliott B. Fitch
Ray T. Jacobs
BY
ATTORNEY

INVENTOR
Elliott B. Fitch
Ray T. Jacobs
BY
ATTORNEY

Fig. 13.
Fig. 13a.
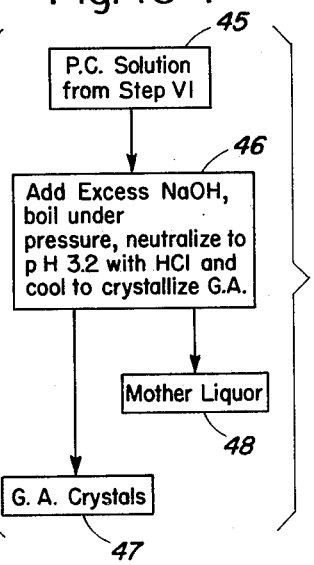
Fig. 13b.
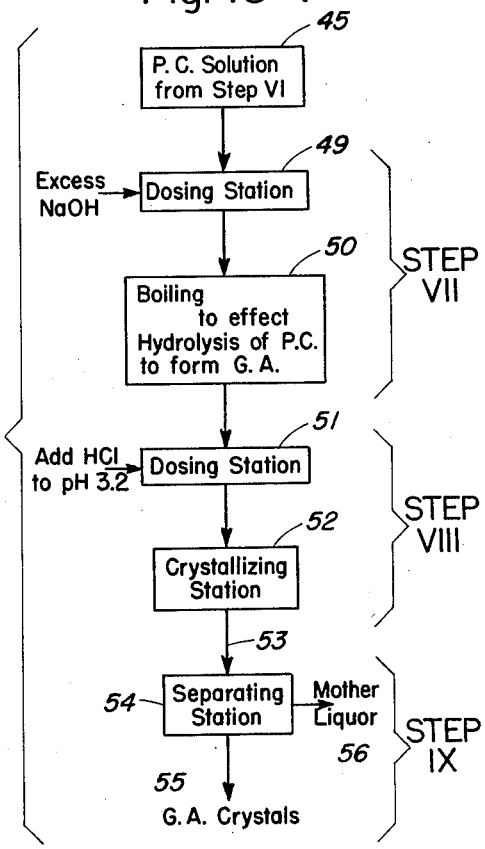

Patented June 13, 1950

2,510,980

UNITED STATES PATENT OFFICE 2,510,980

RECOVERY OF GLUTAMIC MATERIAL IN THE IONIC PURIFICATION TREATMENT OF SUGAR-BEARING SOLUTIONS

Ray T. Jacobs, Twin Falls, Idaho, and Elliott B. Fitch, Westport, Conn., assignors to The Dorr Company, Stamford, Conn., a corporation of Delaware Application February 12, 1949, Serial No. 76,154

2 Claims. (Cl. 260—527)

This invention relates to the purification of sugar-bearing solutions or juices through ion exchange treatment as coupled with the recovery as by-products of certain non-sugars naturally occurring in the juice. More specifically, this invention relates to the isolation and recovery of glutamic compound contained as glutamine in beet sugar juice.

Glutamine is potentially decomposable by forming as a degradation product a pyrrolidone compound such as ammonium pyrrolidone carboxylate. Such degradation may be induced by the influence of heat if not chemically. Prior concept had it that in raw hot diffusion beet juice the glutamic compound such as glutamate could be present substantially only in the form of its degradation product, namely the pyrrolidone compound, since it was considered as having been broken down by the heat applied in the diffusion treatment step, and indeed more so by the heat applied in subsequent defecation treatment steps leading to the production of hot clarified beet sugar juice. Thus the glutamic compound was thought to be present substantially only in the form of pyrrolidone carboxylate, except for that portion of the glutamic content of the juice that was represented in the form of glutamic acid. Glutamic acid also potentially decomposable or convertible to pyrrolidone compound in the form of carboxylate or carboxylic acid, is nevertheless considerably more stable and resists such degradation by heat, and indeed requires protracted heat treatment under suitable pressure conditions as by autoclaving in order that such conversion or degradation may take effect.

Contrary to such prior concept with regard to the instability or behavior of the glutamine in beet sugar juice, we have observed that in a raw diffusion beet sugar juice from an operating beet sugar factory and even in the defecated hot clarified juice the glutamic material was surprisingly and preponderantly represented as glutamine or in a form in which it behaved as glutamine at least insofar as the teachings of this invention are concerned. We prefer, however, to have the defecation operation carried out at as low a temperature and as expeditiously as possible, in order to discourage any tendency of glutamine decomposition.

This invention has for its object the recovering of the glutamine present in the juice as a glutamic compound in any equivalent form and substantially pure. This means that diffusion juice is to be processed in such a manner that the desired glutamic compound is isolated from the juice as well as from substantially all other dissolved impurities therein, namely inorganic or ash-constituents as well as other organic constituents or amino compounds, and that at the same time a sugar solution is obtained as a result of this process, which is highly purified not only from suspended but also from dissolved impurities. Such a highly purified juice contains a correspondingly high proportion of crystallizable sugar, inasmuch as impurities in the juice hamper, or interfere with, the crystallization of the sugar. This is because of the fact that the yield of crystallizable sugar is somewhat in inverse proportion to the impurities content of the juice. In other words the greater the impurities content the greater is the loss of otherwise crystallizable sugar in the residue or molasses which accrue from the crystallizing operations.

In principle this invention proposes first to remove from the sugar solution all anions by adsorbing them upon an ion exchange material while the solution contains the glutamine as such, then to convert the glutamine into the salt of an adsorbable anion, namely ammonium pyrrolidone carboxylate by heating. This pyrrolidone compound is thus left in the solution as the only anion and it can therefore be removed from the sugar solution by adsorbing it on an anion exchange material from which in turn it can be removed or unloaded in substantially pure condition to be reconverted into a glutamic compound, namely glutamic acid or a salt thereof.

This invention proposes to attain the above object of isolating the glutamic by-product by controlling and utilizing the degradation of the glutamine in a manner whereby the resulting degradation product, namely pyrrolidone carboxylate can be isolated as such and then be reconverted by suitable treatment into the desired glutamic compound such as glutamic acid or a salt thereof. In the course of this process there results a solution carrying the carboxylate along with other dissolved impurities, and that solution is contacted with an acid-regenerated bed of cation exchange material which renders the carboxylate into its acid form, namely carboxylic acid. Thus the pyrrolidone compound becomes acidic and distinct from accompanying impurities which are cationic and, therefore, after substantially all other impurities have been left behind in the course of the process, it is adsorbable by a bed of alkali-regenerated anion exchange material from which in turn it can be unloaded by regeneration of the bed with a suitable alkali, then to be subjected to treatment effecting the conversion of the pyrrolidone compound to glutamic acid or a salt thereof.

The process for attaining the object of isolating the glutamic by-product while obtaining highly purified sugar solution, involves a sequence of treatment steps which is outlined in brief as follows:

Defecated and cooled sugar juice is subjected to a primary stage of ion exchange treatment which comprises passing the juice first through a column of acid-regenerated cation exchange resinous material and then through a column of acid-adsorbing anion exchange resinous material. For reasons hereinafter more fully explained the flow of juice through the cation exchange column is continued past the point of organics- or amino acid breakthrough and on to the point where the inorganics break through. The meaning of the terms organics breakthrough and inorganic breakthrough will be more fully explained and discussed hereinafter as to their significance with respect to this invention. Suffice it to say at this time that in the course of exhaustion of this primary ion exchange station there is derived first an effluent volume which is substantially freed of all impurities inorganics (ash) as well as organics (amino compounds) due to both kinds of impurities at that time being adsorbed by the exchange columns of this station. This is followed by an effluent juice volume containing a significant quantity of amino acids although freed from inorganic (ash) constituents. The amino acids of this volume include glutamine previously adsorbed by and now being displaced from the cation exchange material plus the amino acids that are normally initially present in the juice since these organics pass unadsorbed through the anion exchange column. In other words, this effluent volume is found to contain a relative high concentration of amino acids in the effluent juice until such time as the inorganics (ash) breakthrough indicates the displacement of the organics from the cation exchange column and thus its exhaustion to be substantially complete. At any rate the juice passing from this primary ion exchange station during the productive phase thereof will have been freed of ash constituents and hence of inorganic anions which otherwise might interfere with subsequent recovery and isolation of the glutamic by-product from the juice.

The effluent juice from this primary ion exchange treatment is subjected to evaporating and sugar boiling operations such as are conventional in beet sugar production. Significantly, with respect to this invention, these operations involve prolonged heating of the juice which has previously been freed of interfering inorganic anions, and under the influence of that heat, glutamine having reached this stage of operation in the juice, is decomposed yielding as a degradation product ammonium pyrrolidone carboxylate in the juice.

The sugar juice now in the form of green syrup from the evaporation and sugar boiling operation is subjected to a secondary ion exchange treatment, again comprising first passing the solution or syrup through a column of acid-regenerated cation exchange resinous material and then passing it through a column of acid-adsorbing anion exchange resinous material. The conduct of operation or mode of exhaustion of the secondary cation exchange column differs from that of the primary cation exchange column in that the flow of the exhausting sugar solution through the column is not continued past the point of amino acids breakthrough. That is, the flow of solution through the column is stopped at the point of amino acids breakthrough so that all possible cations as well as all possible amino acids are adsorbed on that column, with only the pyrrolidone compound remaining in the sugar solution along with anions which may have leaked past the primary anion exchange station.

While this is the net result it should be understood that the pyrrolidone compound that reaches the secondary cation exchange column is in the form of pyrrolidone carboxylate, but in passing through that column and because of H-ions being released therefrom by way of cationic exchange, the pyrrolidone compound emerges from this column in its acid form, namely as pyrrolidone carboxylic acid in the sugar solution. In this form the pyrrolidone compound represents in principle the only anion left in the solution.

This is due to the fact that in the course of the process ash cations have been retained in and by the primary cation exchange column while ash anions have been collected on the primary anion exchange column. Amino acids, however, including glutamine residual in the juice and having been driven past the primary anion exchange station and having carried with the juice through the evaporation station, these amino acids have finally been allowed to be adsorbed by the secondary cation exchange column along with the cationic ammonium ions liberated by the glutamine decomposition and along with whatever cations might have leaked from the primary ion exchange station.

The pyrrolidone carboxylic acid left substantially alone in the juice can now be isolated from the sugar solution by passing that solution through the secondary anion exchange column and allowing the now anionic pyrrolidone compound or pyrrolidone carboxylic acid to be adsorbed on and by that column. Subsequently that compound is eluted or unloaded from this column and subjected to treatment for reconverting it into glutamic compound, namey glutamic acid or a salt thereof representing the desired by-product of this process.

This invention takes advantage of a known purification treatment of beet sugar juice whereby the beet sugar juice is substantially freed not only of suspended impurities but also significantly of non-sugars which are dissolved in the juice.

This known purification treatment has for its object to produce a sugar solution of exceptionally high purity and freed of color-imparting impurities to the extent that the sugar solution appears water-clear. As a result of such purification treatment a maximum yield of crystallizable sugar is obtainable from the solution. That is to say, the higher the purity of the sugar solution, the higher is the potential yield of crystallized sugar therefrom.

The known method of producing a sugar solution of such high purity proposes first to subject a raw or so-called diffusion beet juice to clarification treatment in a more or less conventional manner termed defecation for effecting the removal from the juice of suspended impurities; then to subject the so-clarified juice still containing dissolved non-sugars to additional purification treatment by ion-exchange also known as de-ionization treatment (and briefly termed D-I treatment) whereby dissolved non-sugars, organic as well as inorganic, along with color-imparting impurities can be abstracted from the sugar solution; and thereafter to subject the thus highly purified sugar solution to concentration by heat and evaporation so that there is obtained a green sugar syrup of high purity from which accordingly a high yield of crystallized sugar is obtainable. It may also be remembered that such de-ionization treatment removes from the juice calcium compound in solution which is a source of potential trouble due to the dreaded tendency of calcium compounds to deposit in the evaporators during the subsequent evaporation step.

In order that the environment of this invention and the invention itself may be clearly understood, it is further necessary to set forth certain known mechanics of ion exchange, and of ion exchange materials involved. There should also be set forth certain characteristics of the ion exchange materials as regards their selective behavior or relative affinity towards different groups or kinds of dissolved non-sugars contained in the juice and to be removed therefrom. Indeed the exchange materials involved in this process discriminate in some respects between the dissolved inorganic and the dissolved organic non-sugars by favoring the one over the other. Hence, in presenting the environment of this invention there should also be set forth the general character and behavior of these two groups of non-sugars contained in the juice relative to each other and relative to the exchange materials.

Inorganic dissolved non-sugars present in the juice are in the nature of inorganic salts and are completely ionized. Most of the organic non-sugars present in the juice are also ionizable and hence adsorbable by ion exchange resins among which notably are various groups of amino acids which are the potential source of the by-product, namely the glutamic compound the recovery of which is contemplated by this invention. These amino acids as found in the beet juice comprise two main groups, namely the acidic and the neutral amino acids (also briefly termed the acidics and the neutrals). Glutamine, glutamic acid, and aspartic acid are representative members of the group of acidics. The problem of this invention which thus presents itself is to recover from the juice glutamic compound substantially pure by separating it not only from the sugar juice but also from any and all of its companion non-sugars-organic as well as inorganic.

Otherwise expressed, this problem resolves itself into the requirements that the inorganics be separated from the organics, and that the organics in turn be treated to isolate the desired glutamic compound from the neutral amino acids as well as from its companion acidic acid, namely the aspartic acid, as well as from its carrier solution, namely the sugar juice.

As for the operation and functioning of the ion exchange mechanism let us first consider the behavior of the inorganics or ionized salts in the sugar juice relative to the ion exchange materials or, vice versa, the effect which the exchange materials exert with respect to the ionized salts.

One ion exchange or de-ionization station comprises in principle a bed of granular cation exchange material and a bed of granular acid-adsorbing anion exchange material through which the sugar solution passes in sequence. Pretreated or clarified sugar juice containing the dissolved inorganic non-sugars or ash constituents passes sequentially through these beds in a manner whereby these beds are kept in submergence. As the solution passes through the cation exchange bed an exchange of cations takes place whereby the cations of the salts are taken up by the exchange material which material in turn releases the molar equivalent of H-ions into the solution. This is because this exchange material has been previously saturated with H-ions by the familiar treatment or regeneration with a strong mineral acid such as $H_2SO_4$. These cation exchange materials are therefore also called H-ion exchange materials and the cycle of their exhaustion and regeneration is called the H-ion exchange cycle.

The exhaustion of such a cation exchange bed by the solution flowing downwardly therethrough progresses in a downward direction, that is in the direction of flow, so that at any one intermediate point of the exhaustion period the bed represents an exhausted upper portion and a non-exhausted lower portion. As the exhaustion proceeds the exhausted portion of the bed grows at the rate at which the non-exhausted portion diminishes until the so-called "breakthrough" occurs, that is when the H-ion exchange capacity of the bed is so far exhausted that cations of the salts begin to appear in the effluent solution passing from the bed. Accordingly the breakthrough of the cation exchange bed is indicated by or has as its criterion a more or less sudden rise of the pH of the effluent solution. However, the cation exchange bed should be subjected to regeneration with a strong mineral acid, such as $H_2SO_4$ after the bed has been washed free of residual sugar solution. Regeneration of the bed also takes place in a progressive manner from end to end of the bed, namely in the direction of flow of the regenerant acid through the bed until the salt- or ash cations on the bed will have been replaced with H-ions from the acid.

Since the cations of the salts in the sugar solution are being replaced with H-ions in the cation exchange bed, the solution flowing from the bed is thereby acidified in direct proportion to the molar concentration of the salts in the solution; hence, the rise in pH of the effluent solution when breakthrough of the cations occurs. For practical purposes ash breakthrough may be indicated and judged by an upward break in the measured conductivity of the effluent sugar solution passing from the bed.

In the operation of a de-ionization station the acidified sugar solution flowing from the cation exchange bed then passes through the anion exchange bed which deacidifies the solution due to its ability to adsorb the acid. This acid-adsorbing quality of the anion exchange material is due to its having been treated or regenerated in the familiar manner with a strong alkali such as $Na_2CO_3$.

Cation as well as anion exchange materials operating in the manner just outlined to effect salt removal or de-ionization, are well-known and commercially available, and they are exemplified by a class of materials sometimes termed exchange resins since they are of synthetic resinous nature.

In view of the problem of this invention it is important to note that the cation exchange materials or resins contemplated for use in this process not only exchange the cations of the inorganic salts in the H-ion cycle, but they also adsorb from the sugar solution certain organic non-sugars comprising neutral as well as acidic amino acids although they do so in some selective or discriminating manner. That is, while capable of adsorbing and collecting amino acids from the sugar solution, they have a greater affinity for or favor the inorganic cations over the organics and hence will collect the cations in preference to the amino acids. Therefore, as the bed becomes progressively exhausted the cations will collect in an upper strata or portion of the bed, while the organics collect substantially in a strata directly subjacent, provided the flow of the solution is assumed to be in a downward direction through the bed. In this way both the inorganics and the organics strata may continue growing as the exhaustion of the bed proceeds, until organics reach the bottom of the bed at which time the organics strata will have reached its maximum depth. If the flow of the exhausting liquid, i. e. sugar solution, be continued beyond this point, there will then occur what might be termed the organics breakthrough, since the inorganics (cation) strata will now continue to grow at the expense of the organics strata. That is, cations will continue to be collected at a rate at which organics are being displaced from the bed by the inorganics. Hence the effluent sugar solution now flowing from this bed will be substantially free of cations, but will contain not only the organics normally present in the solution but also those previously collected and now being displaced from the bed due to the continuing growth of the inorganics strata. The flow of the solution through the bed may be continued until a major portion of the organics will have thus been displaced from the bed and the inorganics strata in turn reaches the bottom of the bed. Thus the bed reaches its actual exhaustion with the appearence of ash cations in the effluent indicating that the cation breakthrough has occurred or is about to occur. It is by taking advantage of this phenomenon of stratification of inorganics and organics in the cation exchange bed, in conjunction with other steps, that the objects of this invention are attained.

In order to attain its objects this invention proposes to operate the de-ionization station in such a manner that a major portion of the organic non-sugars including a substantial portion of the glutamic compound is selectively displaced from the cation exchange bed; and thereafter to remove the anionic impurities from the juice by passing it through the acid-adsorbing anion exchange bed. Consequently during the exhaustion period of the cation exchange bed there flows initially from the de-ionization station, namely during the first part of the exhaustion period of the cation exchange bed, a sugar solution that is substantially freed not only of its inorganic salt or ash impurities but also of its organic non-sugars, that initial period extending to the point where the organics begin to be displaced. Hence, during the remaining portion of the exhaustion period of the cation exchange bed the treated juice flowing from the de-ionization station will be substantially free of inorganics but will carry in it dissolved the organics including glutamic compounds which are being displaced.

In this way strongly basic cations, such as ash cations, are first selectively adsorbed from the feed sugar solution by means of the cation exchange bed. Retention of the glutamic compound (in the form of glutamic acid and/or glutamine) by the cation exchange bed is avoided by causing the glutamic compound to be displaced from the bed by the strong bases present in the feed solution. From a by-product standpoint, this conduct of the operation of the cation exchange bed so conditions the sugar solution that as a net result it will retain a substantial portion of the glutamic compound originally present in it, but will have been selectively freed of strong basic cations. Thus by exchanging the strong cations for H-ions the anionic impurities are converted into their corresponding acids, so that they can be adsorbed from the solution by means of an acid-adsorbing anion exchange resin. Then after passing through the bed of anion exchange resin the treated solution will be more or less free of adsorbable anion impurities, but will still carry glutamic compound, weakly cationic impurities, and indeed also the dissolved sugar which it is desired to eventually recover as pure as possible either in the form of a syrup or crystallized. This effluent solution from the de-ionization station is herein termed the de-ionized sugar juice.

Next, in order to attain its object of isolating and recovering the glutamic compound separate from the sugar solution and separate from other amino acids or organics, this invention at this stage proposes to convert the glutamic compound in the de-ionized sugar solution into a form in which it is discriminated against with respect to the other organics if the solution is contacted with a suitable ion exchange material. To this end this invention proposes to subject the de-ionized sugar solution to the effect of heat or to heat combined with pressure in order to thereby selectively convert the glutamic compound to pyrrolidone carboxylic acid in the solution or juice. The sugar solution emerging from this conversion treatment is herein termed the Impure conversion syrup. The importance of this conversion step is that the resulting P. C. in distinction from the non-converted organics or amino acids is not adsorbed by an acid regenerated cation exchange material of the kind herein contemplated although by contrast it is adsorbable by an alkali-regenerated anion exchange material of a suitable kind herein proposed.

That is to say, this invention is based upon the following consideration. The glutamic compound itself, such as the glutamic acid or glutamine, is cationic in its ion exchange behavior and can therefore be separated together with other amino compounds from anionic and non-ionic impurities in general by anion exchange process. Thereafter the glutamic compound in the mixture of amino acids is converted to P. C. which is non-cationic in its behavior. Indeed, as an anion the P. C. is separable from accompanying cationic impurities such as cationic amino compounds by an ion exchange process. In other words the glutamic acid along with cationic impurities or salt cations is separated from the anions while it is a cation, is then converted into a non-cationic compound, namely P. C., and as such is isolated from the cationic impurities, to be reconverted to the glutamic compound.

Next, therefore, this invention proposes to pass the impure conversion juice containing the P. C. through a secondary bed of acid-regenerated cation exchange resin which will adsorb any residual cations in the conversion sugar solution along with those cations which have formed by and are resulting from the conversion reaction itself. Along with these cations this cation exchange bed will also adsorb the non-converted organics including neutral- and acidic amino acids, the acidics notably comprising aspartic acid usually found as a close companion of the glutamic compound which it is herein desired to have isolated and recovered. Hence there flows from this secondary cation exchange bed the sugar solution or syrup as a carrier for the now substantially isolated P. C. In order to separate the P. C. from this carrier solution, the solution is passed through a secondary bed of alkali-regenerated anion exchange material which retains the P. C. while discharging a sugar solution termed green syrup having the desired high degree of purity for attaining an accordingly high yield of crystalline sugar.

The separated P. C. held by the secondary anion exchange bed is then removed or eluted therefrom, for example by the regeneration of that bed with an alkali solution. The resulting effluent solution from that bed containing the P. C. is then subjected to suitable additional treatment leading to the reconversion of the P. C. to glutamic compound representing the by-product to be obtained by the process according to this invention.

According to one feature, in order to effect the conversion of the glutamic compound to P. C., this process takes advantage of the heat conditions prevailing in the evaporating treatment stage. For the purpose and environment of this invention the evaporating treatment stage may herein be understood to comprise one or more sugar-boiling or crystallization treatment stages which usually follow the juice evaporators proper. The solution or mother liquor that yields from a strike of sugar, that is from a crystallization treatment step, is known as green syrup. In this way a system of beet sugar purification treatment, such as referred to above, can be utilized for the purpose of this invention, if the sugar solution from the evaporating stage is passed sequentially through additional or secondary cation and anion exchange beds, and if the primary de-ionization station that precedes the evaporators is operated in the manner discussed above whereby the organics with the glutamic compounds are separated from the inorganics and thus reach the evaporators for the purpose of selective conversion therein of the glutamic compound to P. C.

Other features and advantages will appear as this specification proceeds.

In the drawings:

Fig. 1 is a synopsis of the process according to this invention.

Figs. 2 and 2ª are equipment flowsheets embodying the process of Fig. 1.

Figs. 3 to 8 illustrate the special manner in which the Primary cation exchange bed is operated for the purpose of this invention.

Figs. 9 to 13 are more detailed flowsheets of a sequence of treatment steps constituting this invention and based upon preceding Figs. 1 to 8.

The Fig. 1 synopsis presents raw beet sugar juice (Diffuser juice) as the starting solution, and lists and summarizes the treatment steps to which this starting solution is sequentially subjected, as follows:

A. Defecation treatment;
B. Cooling;
C. Primary ion exchange treatment (de-ionization treatment):
 (a) Primary cation exchange treatment (step I);
 (b) Primary anion exchange treatment (step II);
D. Concentration by evaporation (followed by boiling and crystallization) which concurrently effects conversion of glutamic compounds to P. C., followed by cooling (step III);
E. Secondary ion exchange treatment;
 (a) Secondary cation exchange treatment (step IV);
 (b) Secondary anion exchange treatment (step V);
F. Displacing P. C. from the secondary anion exchange bed (step VI);
G. Reconverting P. C. to form glutamic compound and crystallizing and separating the latter (steps VII, VIII and IX).

The process according to the synopsis of Fig. 1 may be performed by way of a number of treatment stations through which the juice sequentially passes. Such a series of treatment stations are diagrammatically shown in the apparatus flowsheet of Fig. 2 which in terms of equipment present the environment for the purification treatment of sugar beet juice. This flowsheet represents the treatment of the sugar beet juice, also termed beet juice, from the point where raw sugar juice is extracted from sliced beets, also known as cossettes, in a so-called diffuser station which produces the raw beet juice known as diffusion juice, through a series of treatment stations to the point where a highly purified syrup, herein termed Pure green syrup, is obtained.

Figure 2:
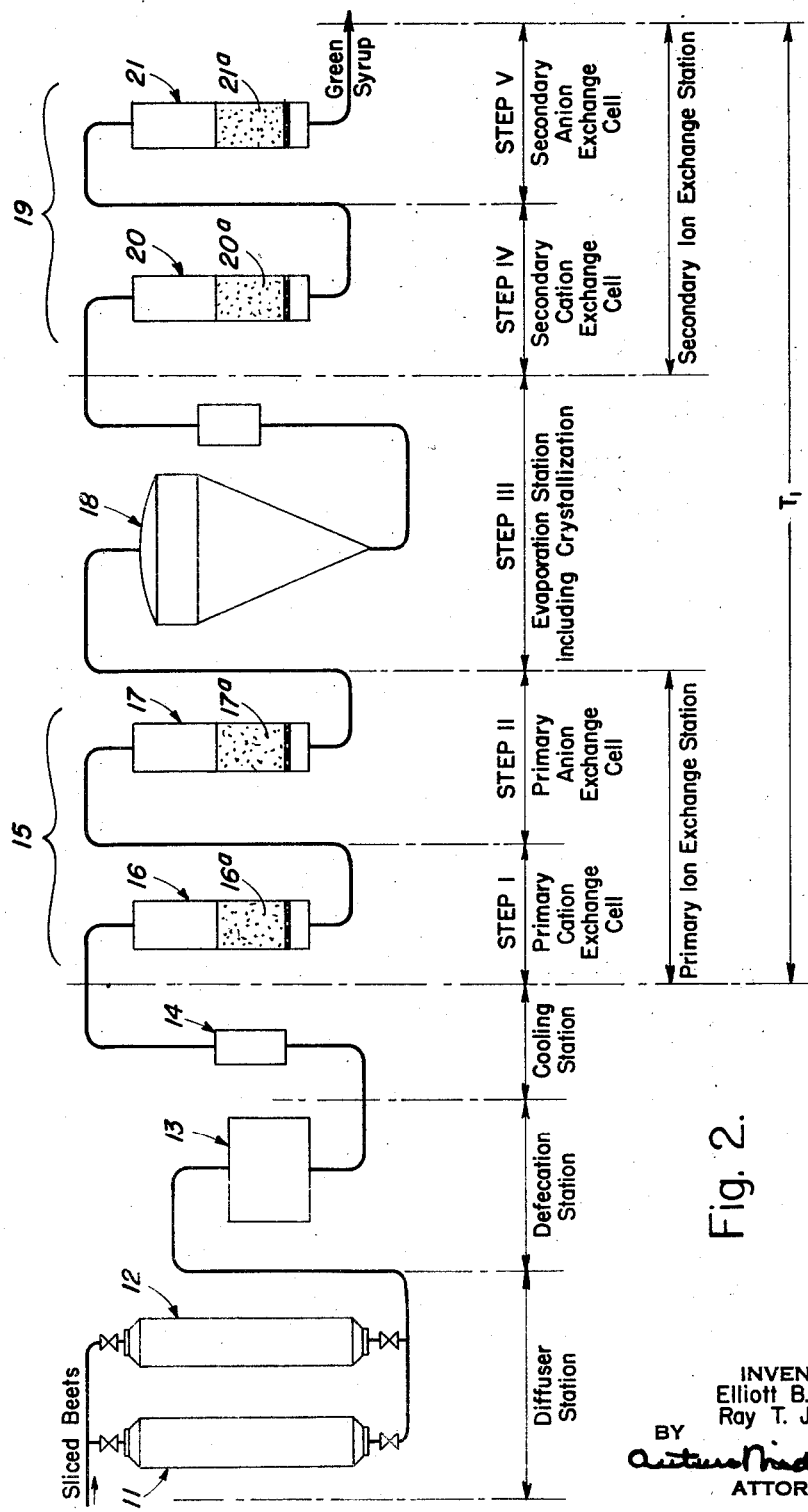

The apparatus flowsheet of Fig. 2 shows a conventional diffuser station or diffuser battery 10 indicated by a pair of diffuser tanks 11 and 12 in which the sliced beets are leached under heat and pressure to furnish the diffusion juice. The extraction of sugar juice from sliced beets, that is the production of the diffusion juice or raw juice, is indicated by diffusion tanks 11 and 12. This raw juice while hot is subjected to clarification treatment in order to effect the removal of suspended impurities from the juice, such clarification treatment being collectively indicated by a defecation station 13 (see Item A—Fig. 1) which in turn may comprise apparatus (here not specifically shown) for liming the juice and for removing separable matter from the juice.

We have observed that the conventional carbonation treatment of limed juice, that is the treatment with $CO_2$, has a tendency to effect prematurely decomposition of the glutamine and thereby to render it unavailable for the purpose of this process. We therefore propose in this process to employ a suitable non-carbonation treatment for defecation, pre-purification or clarification which largely relies on the treatment with lime under controlled conditions, and which for the present purpose is designated as liming treatment.

This clarified juice still hot is passed through a cooling station 14 preparatory to its being further passed through a primary exchange station 15 which in turn comprises a primary cation exchange cell 16 and a primary anion exchange cell 17, through which cells the clarified and cooled juice is passed in series. The cation exchange cell 16 contains a bed 16ª of granular cation exchange material, while the anion exchange cell 17 contains a bed 17ª of granular anion exchange material.

As the juice passes through the cation exchange bed 16ª it gives up the cations of its inorganic or ash impurities which are retained by the exchange material in exchange for H-ions which thus released into the juice form with the ash anions the corresponding acids. Besides these acids the juice flowing from the primary cation exchange bed also carries a significant quantity of cationic organic impurities as represented by acidic- and neutral-amino acids herein also termed acidics and neutrals respectively. The acidics it will be remembered include glutamic compound in the form of glutamine along with aspartic acid, the glutamic compound being the one which it is desired to have isolated as a by-product by means of this process.

The effluent juice from the primary cation exchange bed carries in it the organics because of the selective character of the exchange material of that bed. That is to say, this cation exchange material, herein also termed a cation exchange resin, because it is of the class of resinous exchange materials, is capable of retaining inorganic cations as well as cationic organics but it is selective in so far as it allows the organics to be displaced from the bed by inorganic cations. In order to remove from the juice at this stage the cations but to leave residual in the juice the cationic organics, this invention proposes to carry the exhaustion of this primary cation exchange bed to a point past the breakthrough of the organics or amino acids. This means that the flow of the juice through this bed is continued to a point where a significant quantity of the organics originally retained by the bed will have been displaced therefrom by the inorganic cations and will appear in the acidified juice now flowing from the bed at the rate at which additional inorganic cations take the place of the organics on the exchange material.

This manner of conducting the operation of a primary cation exchange bed 16 will be further described below in conjunction with Figs. 3 to 8. At any rate the acidified juice from the primary cation exchange bed 16 flows on to and through the primary anion exchange bed 17a where the acids are retained or adsorbed by the exchange material while the cationic organics comprising glutamic compound are carried further along with the juice flowing from this bed to an evaporator station as is indicated by an evaporator 18. Within the concept of this invention the evaporation station 18 has a dual function in that it evaporates the juice so that it will produce a concentrated juice or syrup or mother liquor, while the influence of the degree of heat prevailing in the station selectively converts the glutamic compound among the cationic organics into a pyrrolidone compound. Indeed, the heat conditions prevailing during the crystallizing operation and in the mother liquor are particularly conducive in selectively converting the glutamic compound among the cationic organics into the equivalent of pyrrolidone carboxylate or pyrrolidone carboxylic acid (herein abbreviated as P. C.) which significantly is anionic and thereby now becomes ionically distinct from all the other organics with which it is mixed. Concurrently with this conversion there are formed contaminating $NH^+$-ions as a result of the conversion reaction.

Hence, there flows from the evaporator 18 what is herein termed the Impure conversion syrup so termed because it carries the P. C. still in mixture with although ionically distinct from cationic organics, the P. C. thus being distinct from the neutral amino acids as well as significantly distinct from the aspartic acid which is one of the acidic amino acids.

Next the impure conversion syrup is subjected to further ion exchange treatment by passing it through a secondary ion exchange station 19 which comprises a secondary cation exchange cell 20 containing a bed of granular acid-regenerated cation exchange material 20a, and a secondary alkali-regenerated anion exchange cell 21 containing a bed of granular acid-adsorbing anion exchange material 21a. As the syrup passes sequentially through these two cells 20 and 21 it gives up to the cation exchange material its contaminating cations along with cationic organics, while the P. C. is adsorbed by the anion exchange material.

That is to say, the operation of the secondary cation exchange bed is conducted in a manner different from the conduct of the primary cation exchange bed 16a, in that the exhaustion of the bed is carried substantially only up to the point of organics breakthrough, but substantially not past that point. In this way a maximum of the cationic organics is retained by the bed and is not allowed to be displaced from the bed.

Such conduct of the operation of the secondary cation exchange bed leaves isolated in the syrup flowing from that bed the anionic P. C. except for acids of anions leaking past the first bed of anion exchange resin. Subsequently as this syrup is passed through the anion exchange cell 21 the acid-adsorbing material therein will retain the P. C. allowing a highly purified sugar solution, herein termed the Pure green syrup, to flow from this cell.

The thus isolated P. C. is then removed or unloaded (see Fig. 2a) from the secondary anion exchange cell 21 by regeneration of the bed 21a of anion exchange material therein with $Na_4OH$ (step VI), and the effluent regenerant liquor then treated to effect conversion of the P. C. to glutamic compound such as glutamic acid or glutamate as the desired by-product. This reconversion is represented by a treatment phase designated at $T_3$ comprising a sequence of treatment steps VII, VIII, and IX representing respectively a conversion station 22 where P. C. is converted to glutamic acid (abbreviated as G. A.) by way of hydrolysis at sufficiently elevated temperatures, concomitant autoclaving pressure being even more conducive to such conversion, a crystallizing station 23 for producing G. A.-crystals, and a separating station 24. The conversion station 22 is indicated by an autoclave 22a and preceding it a dosing station 22b where excess NaOH is added to the liquor preliminary to the hydrolysis or conversion reaction which is to take place under suitable autoclaving pressure and heat. G. A.-crystals indicated at 25 and mother liquor 26 leave the separating station 24 along different paths.

The special manner referred to above of conducting the operation of the primary cation exchange cell 16 will now be described in conjunction with the Figs. 3, 4, 5, 6, 7, and 8 representing successive stages of exhausting the bed of cation exchange material in this cell. This manner of exhaustion is characterized by sequential points of breakthrough important for the purpose of this invention, namely first the organics breakthrough, that is the point where organics previously adsorbed by the bed begin to appear in the effluent juice from that bed, and second the inorganics breakthrough, that is the point where organics have been substantially displaced from the bed and where inorganic cations begin to appear in the effluent juice flowing from this bed.

Figs. 3 to 6 represent a first phase $P_1$ in the exhaustion of this cation exchange bed, namely the exhaustion substantially to the point of organics breakthrough, while Figs. 7 and 8 represent a phase $P_2$ in the exhaustion, namely the further exhaustion substantially to the point of inorganics breakthrough.

Fig. 3 represents the primary bed of cation exchange material 16 in an initial stage of exhaustion when the exhausting solution or sugar juice flows downwardly through the bed in a manner whereby substantial submergence of the bed in the juice is insured. Hence, Fig. 3 indicates an initial stratum $a$ at the top of the bed as the stratum which has adsorbed an initial quantity of inorganic cations whereas a stratum $b$ directly subjacent represents that portion of the exchange material that will have adsorbed a corresponding quantity of organics. This Fig. 3 consequently shows a large portion of the balance of the bed as represented by the unexhausted depth $c$ thereof. As the juice continues flowing downwardly through the bed each of these strata $a$ and $b$ respectively will continue to grow in depth at a rate which is in proportion to the volume of juice flowing downwardly through the bed.

Fig. 4 presents a somewhat further advanced state of exhaustion of the bed, namely a condition where both the inorganics and the organic strata of exhaustion have grown as presented by their respective depths $a_1$ and $b_1$ leaving a decreased unexhausted portion of the bed of a depth $c_1$, this unexhausted portion however still representing a major portion of the total depth $D$ of the bed.

In Fig. 5 the growth of the respective strata of exhaustion of the bed has proceeded further due to continued downward flow of the juice through the bed, this condition being represented by further increased strata $a_2$ and $b_2$ of the inorganics and the organics respectively, both of these strata of exhaustion now occupying a major portion of the total depth of the bed leaving unexhausted a minor portion or bottom stratum as indicated by the depth $c_2$.

Fig. 6 illustrates roughly and in diagrammatic fashion the condition where the exhaustion of the bed has reached the organics breakthrough point, that is the point where organics begin to appear in the effluent because they are beginning to be displaced from the bottom portion of the bed by inorganic cations which the bed continues to adsorb at the expense of the organics. Accordingly this organics breakthrough point is indicated in Fig. 6 by the fact that both the inorganics and the organics strata together now occupy the total depth of the bed and are represented by their own respective depths $a_3$ and $b_3$.

Fig. 7 represents a next following condition of the bed on the assumption that the juice has continued flowing therethrough downwardly, in which the inorganics stratum of exhaustion has increased beyond that of Fig. 6 while the organics stratum has correspondingly decreased indicating that a portion of the organics previously held adsorbed by the bed has now been displaced into the effluent juice by inorganic cations additionally collected by the bed. This condition is indicated by the relatively increased depth $a_4$ of the inorganics strata and the relatively decreased depth $b_4$ of the organics strata.

Fig. 8 may be looked upon as representing that condition of the bed where incident to the substantially complete displacement of the organics strata the point of inorganics breakthrough is being reached. Fig. 8 therefore indicates the total depth $D$ of the bed now to be identical with the depth of the inorganics stratum $a_5$, the organics stratum in turn having disappeared by way of displacement. This substantially concludes the exhaustion phase in the operating cycle of this bed as conducted for the purpose of this invention, inasmuch as further flowing of juice through the bed would increasingly produce inorganic cations or dissolved ash impurities in the juice which would then pass unaffected through the subsequent primary anion exchange bed and reach the evaporating stage where they are undesired.

*Detailed description of the process (Figs. 9 to 13)*

The following detailed description of this process starts at the point where already defecated and cooled beet juice is about to enter the primary ion exchange treatment station. That is to say, this covers a treatment phase which in Fig. 2 is designated as $T_1$ and which includes the primary ion exchange station 15, the evaporation station 18, as well as the secondary ion exchange station 19, these stations in turn representing the treatment steps I, II, III, IV, and V. These treatment steps (of phase $T_1$) are represented by the more detailed flowsheet diagrams, Figs. 9, 10, 11. The subsequent treatment phase of Fig. 2a and designated as $T_2$ includes the removal by regeneration of P. C. from the secondary anion exchange bed $21^a$, as well as subsequent treatment steps for effecting in the P. C. liquor flowing from the bed the formation of glutamic compound crystals and their separation from their mother liquor. This treatment phase $T_2$ therefore includes the unloading of P. C. from the anion exchange bed $21^a$ (step VI) and following it the treatment phase $T_3$ (steps VII, VIII, and IX) for reconverting the P. C. and producing G. A.-crystals. A more detailed flowsheet of the P. C. unloading step (step VI) is shown in Fig. 12.

Figure 9:
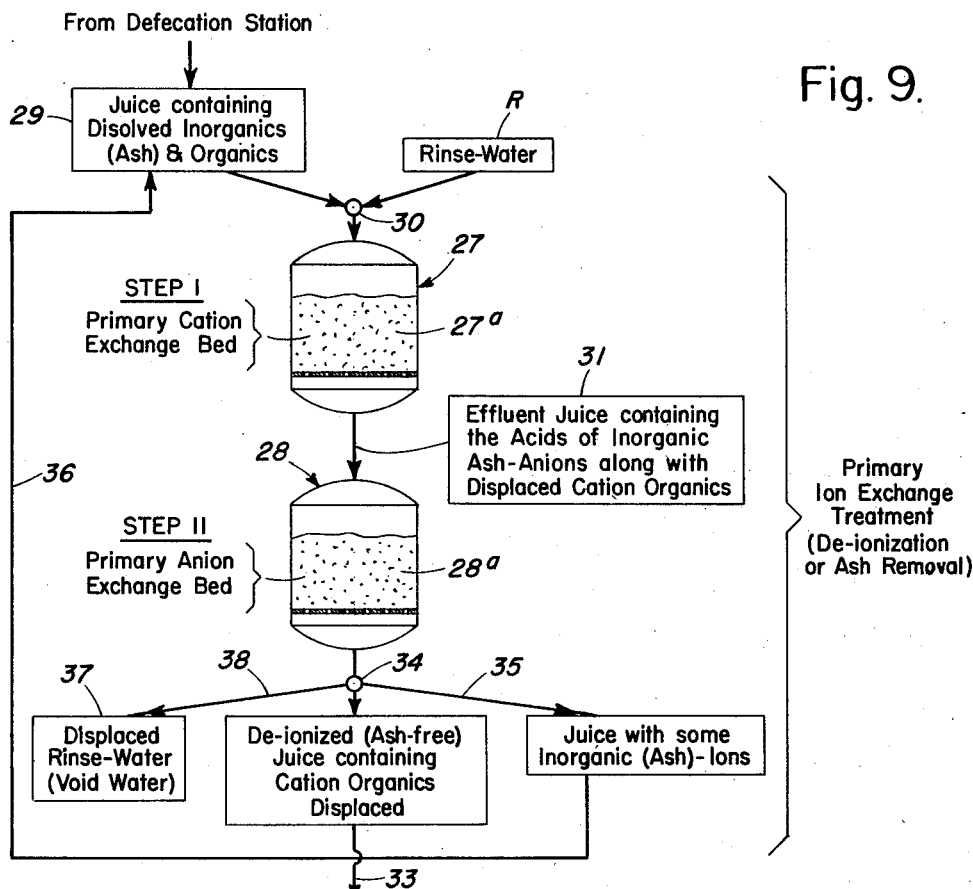

Fig. 9 represents in detail the operation of the primary ion exchange station 15 including the treatment steps I and II as represented by a primary cation exchange cell 27 and a primary anion exchange cell 28 respectively. These cells 27 and 28 operate in series and correspond to the primary cation- and anion-exchange cells 16 and 17 respectively of Fig. 2. A bed $27^a$ of granular acid-regenerated cation exchange material is indicated in the cell 27, while a bed $28^a$ of granular alkali-regenerated acid-adsorbing anion exchange material is indicated in cell 28.

Defecated and cooled beet sugar juice indicated at 29 and containing inorganic ionized salts or ash impurities along with dissolved organic impurities passes through a two-way valve 30 to and into the cation-exchange cell 27 and downwardly through the bed $27^a$ of exchange material therein. As the juice continues to flow through this bed inorganic cations as well as organic impurities are collected upon the bed in respective strata, while H-ions from the bed are being released into the juice to form therein with the anions the corresponding acids. The formation and growth of these strata with the continued flow of juice through this bed proceed in the manner described above and illustrated in Figs. 3, 4, 5, 6, 7, and 8.

For the purpose of this invention the flow of juice through this primary cation exchange bed $27^a$ is continued past the organics breakthrough such as defined above in conjunction with and illustrated by Fig. 7 when organics begin and continue increasingly to appear in the effluent juice passing from this bed. The flow of juice through this bed is to be interrupted when a significant quantity of the organics will thus have been displaced from the bed by inorganic cations as indicated by the cation breakthrough such as defined above in conjunction with and illustrated by Fig. 8. The effluent juice 34 from the primary cation exchange bed 27 is subjected to de-acidification treatment (step II) by being passed through the primary anion exchange bed 28 which removes from the juice the inorganic anions by adsorbing the acids previously formed, but leaves the cationic organics, including the glutamine, unadsorbed in the juice. Thus there passes as effluent from this anion exchange bed through a three-way valve 34 a juice substantially freed of dissolved ash constituents and hence herein termed de-ionized juice indicated as such at 33 yet containing the cationic organics, comprising the neutrals and acidics which latter in turn comprise aspartic acid along with the glutamic compound which it is desired to have isolated and recovered by this process.

As a matter of practical operation of the primary ion exchange station, the exchange capacities of both the cation exchange bed 27a and the anion exchange bed 28a are such that they reach their final state of exhaustion substantially simultaneously. Therefore, in Fig. 9 when the cation- (ash-) breakthrough has been reached and the flow of juice to the bed 27a has been stopped, rinse water R is fed through the two-way valve 30 so that it may pass serially through both beds thereby displacing residual juice from both beds and finally through three-way valve 34. The residual sugar solution thus being displaced at best only partly de-ionized is conducted along a separate path 35 for recirculation through the beds in a subsequent operating cycle, as is indicated by recycle path 36.

Thereafter each bed of this primary ion exchange station is separately regenerated in a known manner—the cation exchange bed with an acid and the anion exchange bed with an alkali. When the regeneration is completed, residual regenerant solution is displaced separately from each bed with rinse water, leaving the void spaces between the granules of the bed filled with rinse water at the end of the rinsing period.

The beds are now ready for a new start so that juice can once more be passed therethrough. The new flow of juice will displace serially from the bed residual rinse water, so-called void water 37 which will pass through the three-way valve 34 and may be disposed of along a separate path 38 until once more de-ionized juice begins to emerge from the effluent end of the anion exchange bed 28.

Figure 10:
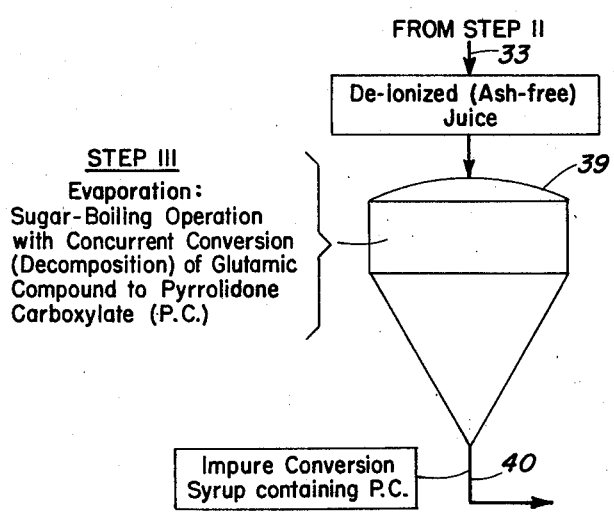

The de-ionized juice 33 from step II carrying the mixture of amino acids is then subjected to evaporation and concentration treatment in step III of Fig. 10, namely to treatment in an evaporation station 39 which corresponds to evaporation station 18 in Fig. 2. Treatment in this station may involve the conventional evaporating and sugar boiling operation in beet sugar production. This involves prolonged heating which causes the glutamic compound or glutamine in the juice to be decomposed so as to produce ammonium pyrrolidone carboxylate.

According to this invention conditions prevailing in the conventional evaporation station including its crystallization stage or stages are utilized for selectively effecting the conversion of the glutamine which is cationic into the pyrrolidone compound which is anionic. Hence there passes from this evaporation station 39 what is herein termed impure conversion syrup, indicated at 40 in Fig. 10 because it contains the conversion product for pyrrolidone compound in mixture with the remaining amino acids and possibly mixed with any cations that might have leaked from the primary ion exchange station and, therefore, been passed through the evaporation station. At any rate, for the purpose of this invention, the important characteristic of this impure conversion syrup 40 is that it is substantially freed of the ash cations and anions originally present in it, and that at this point it has left in it as impurities substantially only cationic amino acids in mixture with the anionic pyrrolidone compound. These cationic and anionic constituents can be segregated from each other inasmuch as they are adsorbable respectively by a suitable cation exchange material and a suitable anion exchange material.

The decomposition of the glutamine to form the ammonium salt of pyrrolidone carboxylic acid, ammonium pyrrolidone carboxylate, as a conversion product takes place under the operating conditions of the evaporation and crystallization station according to the following equation:

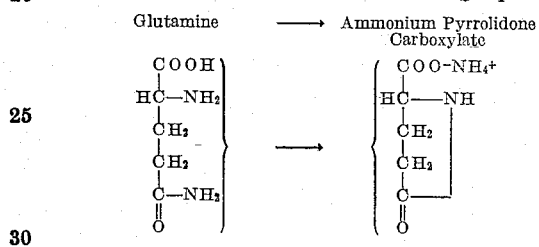

Figure 11:
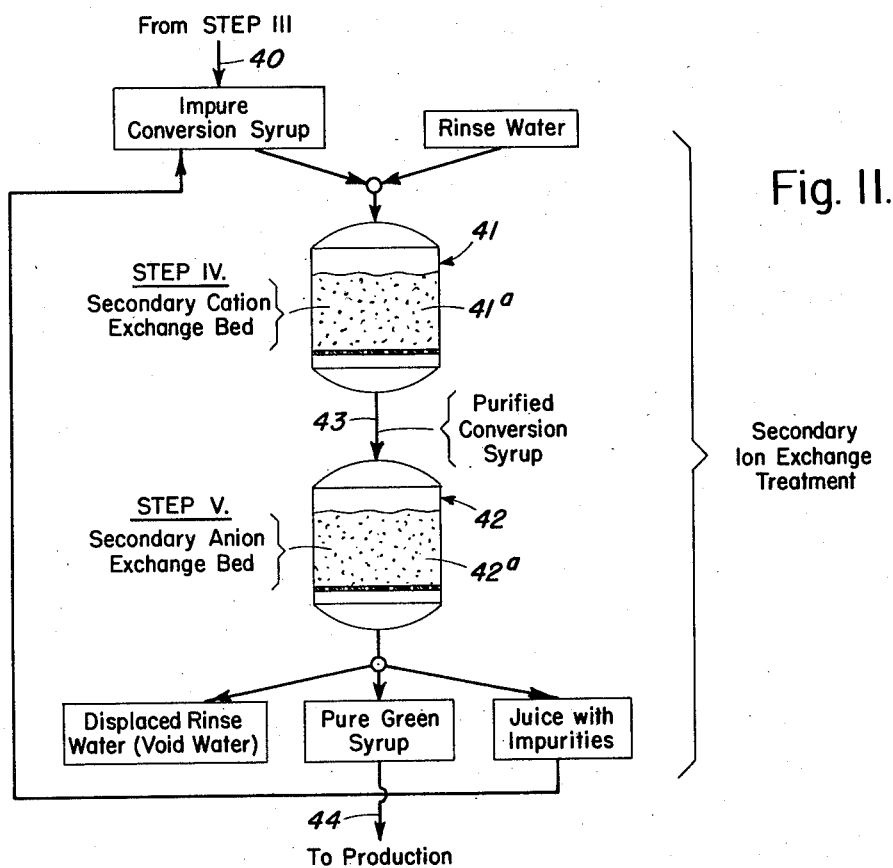
Figure 12:
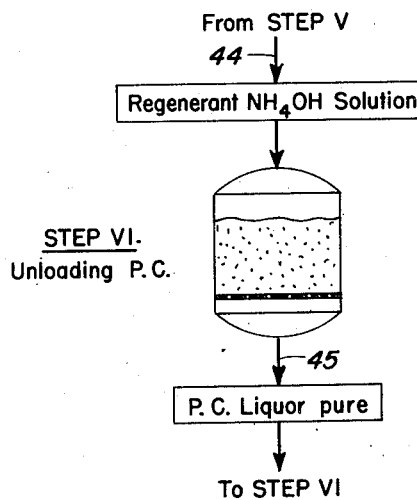

In the impure conversion syrup 40 flowing from the evaporation step (step III), in order to effect the segregation of the cationic amino compounds and of the anionic pyrrolidone compound from each other as well as from the sugar solution, this impure conversion syrup is subjected to the secondary ion exchange treatment comprising the steps IV and V in Fig. 11. This corresponds to the secondary treatment station 19 in the overall flowsheet of Fig. 2. This treatment phase involves passing the impure conversion syrup 40 through a secondary cation exchange cell 41 containing a bed 41a of acid-regenerated cation exchange material and subsequently passing it through a secondary anion exchange cell 42 containing a bed 42a of alkali-regenerated anion exchange material. These cation and anion exchange cells correspond to the ion exchange cells 20 and 21 of the overall flowsheet of Fig. 2.

The ion exchange material of the secondary ion exchange beds 41a and 42a may be in the nature of those contained in the cation and anion exchange cells 16 and 17 or else of the cells 27 and 28 respectively of the primary anion exchange station shown in Fig. 2 as well as in Fig. 9. These exchange materials may be of the resinous kind sometimes also called exchange resins which of themselves are known and commercially available. The mother liquor or impure conversion syrup 40 from the evaporation station or sugar boiling operation is fed to and passed through the secondary cation exchange bed 42a so that it may adsorb from the solution all the remaining cationic impurities in exchange for H-ions. In this way the bed retains $NH^+$-ions, the cation of the ammonium pyrrolidone carboxylate, as well as notably the amino compounds. That is to say, in distinction from the operation of the primary cation exchange bed 16a or 27a of Figs. 2 and 9 respectively, the operation of the secondary cation exchange bed 41a is conducted in such a manner that the flow of the sugar solution therethrough is not continued past the point of amino acid breakthrough. Because of this manner of operation there flows, for the purpose of this invention, from the secondary cation exchange bed a syrup containing pyrrolidone carboxylic acid substantially pure and therefore called the purified conversion syrup which is indicated at 43 in Fig. 11.

The pyrrolidone carboxylic acid in this cation exchange bed results from the ammonium pyrrolidone carboxylate because of the H+-ion exchange taking place in this bed with regard to this compound in the following manner:

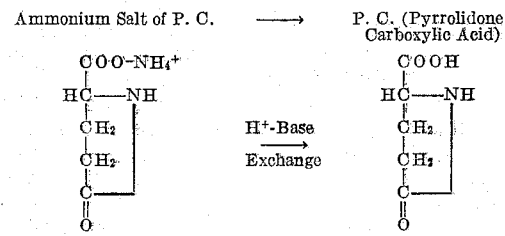

The purified conversion syrup 43 then flows through the alkali-regenerated anion exchange bed 42a which adsorbs the pyrrolidone carboxylic acid which represents substantially the only ionic non-sugar now left in the solution so that there flows from this bed a highly purified sugar solution or pure green syrup 44 which may be further processed for attaining a yield of crystallized sugar therefrom.

In other words, after passing through the secondary cation exchange bed 41a the sugar solution or syrup is largely free of ionic non-sugars except the anionic pyrrolidone compound. That is because inorganic (ash) cations have been adsorbed by the primary cation exchange bed 27a while adsorbable anions have been adsorbed by the primary anion exchange or acid-adsorbing bed 28a. Amino acids which had been displaced from and driven past the primary cation exchange bed 27a and which have passed on through the primary anion exchange bed 28a and further on through the evaporation station 39, these amino acids have been adsorbed in the secondary cation exchange bed 41a along with the ammonium ions liberated by the glutamate decomposition that has taken place in the evaporation station, and also whatever cations may have leaked through and form the primary cation exchange bed 27a. Hence the only ionic and ionically adsorbable substances remaining in the sugar solution are the pyrrolidone carboxylic acid, and any adsorbable anions which may have leaked past the primary anion exchange acid-adsorbing bed 28a. Thus the secondary anion exchange acid-adsorbing bed 42a picks up pyrrolidone carboxylic acid which may be contaminated merely by such leakage anions, and therefore in relatively and substantially pure condition. This pyrrolidone compound may be unloaded or eluted from the secondary anion exchange bed and the resulting effluent solution may be treated for recovery of glutamic acid or a salt thereof.

It thus appears according to this embodiment that the operation of the process is so conducted that the primary ion exchange station mainly effects a separation between ionized inorganic non-sugars (ash) and adsorbable organic non-sugars (amino compounds); the inorganics being eliminated whereas the secondary ion exchange station eliminates and isolates the pyrrolidone compound for recovery while at the same time yielding a highly purified sugar solution.

However, merely from the standpoint of P. C. recovery, it is unnecessary to remove all residual cationic impurities in the secondary ion exchange station, since it is only necessary to remove those cations which would interfere with subsequent adsorption of the P. C. in the secondary acid-adsorbing anion exchange bed. Hence, those amino acids which reach the primary cation exchange bed need not necessarily be removed since they are too weakly basic to interfere with the P. C. adsorption. In that instance only the cations of stronger bases need be removed and, therefore, the secondary cation exchange bed may be run to a point past amino acid breakthrough up to the point of ammonium or ash cation breakthrough without appreciably impairing the desired final P. C. recovery.

In other words from the standpoint and for the purpose of glutamic compound recovery, all that secondary cation exchange bed need do is to render the pyrrolidone carboxylate as its corresponding pyrrolidone carboxylic acid by adsorbing all cations except those of very weak bases such as amino acids and betaine, and replacing them with hydrogen-ions by way of exchange. In this case of treating beet sugar juice for the purpose herein exemplified it is desirable to remove the weak bases also so that a high degree of purification of the finally resulting sugar solution may be attained. In any instance, the secondary acid-adsorbing anion exchange bed retains the P. C. from the solution.

Then follows the reconversion proper of P. C. to glutamic compound, the desired by-product, and its recovery in crystallized form, all represented by the treatment phase T3 which is a part of the phase T2 (see Fig. 2a) involving as one embodiment within this process the steps VII, VIII, and IX. The phase T1 as a whole is herein termed the recovery phase while the phase T3 within phase T2 is herein termed the reconversion phase. The steps of the treatment phase T3 are represented in Fig. 13 which in turn comprises Figs. 13a and 13b. That is to say, Fig. 13a presents a condensed showing of all three steps VII, VIII, and IX of phase T3 while Fig. 13b represents a more detailed showing of this phase.

According to Fig. 13a the conversion of P. C. to glutamic compound is effected by adding excess NaOH, bringing the solution to boiling temperature, autoclaving conditions being particularly conducive to promote the conversion reaction; after releasing the solution from the autoclave neutralizing it with HCl to a pH about 3.2 in order to render the glutamic acid salt as glutamic acid, then cooling the solution to effect precipitation of G. A.-crystals. That is to say, during the hydrolysis reaction in the autoclave P. C. undergoes a molecular reaction yielding glutamate according to the following formula:

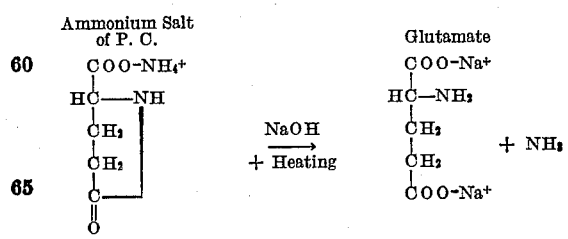

Therefore, neutralizing the solution from the autoclave from HCl renders the glutamic acid salt as glutamic acid.

The combination of these treatment steps is indicated in Fig. 13a by the numeral 46. The resulting G. A.-crystals 47 are indicated as having been separated from their mother liquor.

In the more detailed presentation of the reconversion treatment phase $T_3$ of Fig. 13$^b$, the P. C. solution 45 from step VI is passed to a dosing station 49 where the excess NaOH is added preparatory to effecting the hydrolysis reaction of the P. C. Then follows the reconversion proper by hydrolysis of P. C. to form glutamate, as indicated by the numeral 50. The hydrolysis liquor flowing from this operation is then dosed with HCl to a pH of about 3.2 in order to render the glutamate from the preceding treatment as glutamic acid, as indicated at 51. The resulting glutamic acid liquor indicated at 52 is subjected to cooling in order to effect precipitation of G. A. crystals as indicated at 52. The mass indicated at 53 from the crystallization operation is then subjected to separation treatment indicated at 54 from which there are derived along separate paths G. A. crystals and their mother liquor indicated at 55 and 56 respectively.

We claim:

1. The method of treating a sugar solution to purify the solution of inorganic and organic dissolved non-sugars and to isolate glutamic compound as a by-product from both the inorganic and the organic impurities whereby glutamic acid is isolated from companion amino acids, which method comprises treating the sugar solution in a primary ion exchange station adapted to retain interfering anions from the sugar solution whereby there is produced a pretreated sugar solution containing glutamic compound along with other amino compounds although substantially free from interfering anions, heating the pretreated sugar solution to a degree and under conditions whereby cationic glutamic compound is selectively converted to anionic pyrrolidone carboxylate along with the liberation of $NH_4^+$ whereby the de-ionized solution is converted to impure conversion solution, passing the impure conversion solution to a secondary ion exchange station in which the solution flows sequentially through a secondary acid-regenerated bed of cation exchange material and a secondary bed of alkali-regenerated acid-adsorbing anion exchange material, so that cations and cationic amino acids are collected upon the secondary cation exchange bed while pyrrolidone carboxylate by ion exchange forms pyrrolidone carboxylic acid to be carried by the sugar solution from the secondary cation exchange bed and so that the carboxylic acid is adsorbed by and isolated upon the secondary anion exchange bed allowing sugar solution substantially freed of both inorganic and organic non-sugars to pass from the secondary ion exchange station, continuing the flow through the secondary ion exchange station until the secondary cation exchange bed is substantially saturated with cationic non-sugars comprising amino acids and until the anion exchange bed is substantially saturated with anionic non-sugars comprising pyrrolidone compound while discontinuing the flow through the cation exchange bed before any appreciable quantity of cations of the group comprising ash cations and ammonium ions break through, unloading isolated carboxylic acid from the secondary anion exchange bed so that liquor containing pyrrolidone compound flows therefrom, and subjecting the liquor to treatment for effecting the reconversion of the pyrrolidone compound to glutamic compound.

2. The method according to claim 1, in which the sugar solution is derived from sugar beets and the conversion of the glutamic compound to pyrrolidone compound is effected in and by an evaporation and concentration treatment step.

RAY T. JACOBS.
ELLIOTT B. FITCH.

REFERENCES CITED

The following references are of record in the file of this patent:

UNITED STATES PATENTS

| Number | Name | Date |
|---|---|---|
| 1,998,485 | Bailey | Apr. 23, 1935 |
| 2,191,365 | Boyd | Feb. 20, 1940 |
| 2,388,194 | Vallez | Oct. 30, 1945 |
| 2,388,195 | Vallez | Oct. 30, 1945 |
| 2,388,222 | Behrman | Oct. 30, 1945 |
| 2,413,791 | Shafor | Jan. 7, 1947 |
| 2,434,715 | Olcott et al. | Jan. 20, 1948 |